US010851859B2

(12) United States Patent
Burns et al.

(10) Patent No.: US 10,851,859 B2
(45) Date of Patent: Dec. 1, 2020

(54) BRAKE SYSTEM FOR MINE TRUCKS

(71) Applicant: Carlisle Brake & Friction, Inc., Solon, OH (US)

(72) Inventors: David Burns, Macedonia, OH (US); Chris Davis, Hinckley, OH (US); Brad Desatnik, Chesterland, OH (US); Michael Koerth, Twinsburg, OH (US)

(73) Assignee: Carlisle Brake & Friction, Inc., Solon, OH (US)

( * ) Notice: Subject to any disclaimer, the term of this patent is extended or adjusted under 35 U.S.C. 154(b) by 0 days.

(21) Appl. No.: 16/034,666

(22) Filed: Jul. 13, 2018

(65) Prior Publication Data

US 2019/0032737 A1    Jan. 31, 2019

Related U.S. Application Data

(60) Provisional application No. 62/537,153, filed on Jul. 26, 2017.

(51) Int. Cl.
*F16D 55/40* (2006.01)
*F16D 65/097* (2006.01)
(Continued)

(52) U.S. Cl.
CPC .......... *F16D 65/0971* (2013.01); *B60T 13/22* (2013.01); *F16D 55/24* (2013.01);
(Continued)

(58) Field of Classification Search
CPC .. F16D 2121/06; F16D 2121/12; F16D 59/02; F01C 21/008; F01C 15/0084
See application file for complete search history.

(56) References Cited

U.S. PATENT DOCUMENTS 2,790,516 A    4/1957  Wright et al.
4,024,936 A *  5/1977  Crabb ................... F16D 55/38
                                                      192/221

(Continued)

FOREIGN PATENT DOCUMENTS

FR    2820794 A1    8/2002
GB    2012012 A     7/1979

OTHER PUBLICATIONS

European Patent Office; Search Report and Written Opinion in related International Patent Application No. PCT/US2018/041987 dated Oct. 5, 2018; 12 pages.

(Continued)

*Primary Examiner* — Bradley T King
(74) *Attorney, Agent, or Firm* — Wood Herron & Evans LLP

(57) ABSTRACT

A brake system for a piece of equipment includes a series of rotors and stators, and a first brake actuator including at least one first piston positioned within a first chamber such that pressurization of the first chamber causes the at least one first piston to operatively engage at least one of rotors or stators such that the rotors and stators are compressed together and thereby create braking torque, and may also include a second brake actuator including at least one spring operatively coupled to at least one second piston positioned within a second chamber such that depressurization of the second chamber causes the at least one second piston to operatively engage at least one of the rotors or stators such that the pluralities of rotors and stators are compressed together and thereby create braking torque.

15 Claims, 9 Drawing Sheets

(51) Int. Cl.
*B60T 13/22* (2006.01)
*F16D 55/24* (2006.01)
*F16D 55/00* (2006.01)
*F16D 57/00* (2006.01)

(52) U.S. Cl.
CPC .... *F16D 65/0972* (2013.01); *B60Y 2200/417* (2013.01); *F16D 57/007* (2013.01); *F16D 2055/0091* (2013.01); *F16D 2055/0095* (2013.01)

(56) References Cited

U.S. PATENT DOCUMENTS

| | | | | |
|---|---|---|---|---|
| 4,263,991 A | * | 4/1981 | Morgan | B60T 13/16 188/170 |
| 4,696,378 A | * | 9/1987 | Brooks | F16D 55/28 188/170 |
| 6,089,357 A | * | 7/2000 | Jackson | B66C 23/86 188/264 F |
| 6,260,668 B1 | * | 7/2001 | McClanahan | F16D 25/0638 188/71.5 |
| 6,302,244 B1 | | 10/2001 | Kernik et al. | |
| 6,405,837 B1 | * | 6/2002 | Muramoto | F16D 55/32 188/170 |
| 6,459,182 B1 | * | 10/2002 | Pfann | H02K 7/1025 188/161 |
| 7,909,147 B1 | * | 3/2011 | Schnell | F16D 65/853 188/264 CC |
| 2002/0148695 A1 | * | 10/2002 | Latsko | F16D 59/02 192/18 A |
| 2004/0251091 A1 | * | 12/2004 | Archer | B60T 11/105 188/71.5 |
| 2010/0012446 A1 | | 1/2010 | Ollat et al. | |
| 2016/0102023 A1 | * | 4/2016 | La Forest | B23K 26/364 428/155 |
| 2018/0252284 A1 | * | 9/2018 | Charles | F16D 69/0408 |

OTHER PUBLICATIONS

The Internatioinal Bureau of WIPO; International Preliminary Report on Patentability in related International Patent Application No. PCT/US2018/041987 dated Jan. 28, 2020; 7 pages.

* cited by examiner

BRAKE SYSTEM FOR MINE TRUCKS

CROSS-REFERENCE

This application claims the benefit of U.S. Provisional Patent Application Ser. No. 62/537,153, filed Jul. 26, 2017, the disclosure of which is incorporated by reference herein in its entirety.

TECHNICAL FIELD

The present invention relates to a brake system and, more particularly, to a brake system for diesel electric vehicles, including large off-highway equipment vehicles such as mine trucks, and other pieces of equipment.

BACKGROUND

Mine trucks and other large off-highway equipment vehicles are often configured as diesel electric vehicles. Diesel electric vehicles use a diesel engine to generate electricity, which is used to power multiple electric motors to propel the vehicle. The electric motors can also be operated in regenerative mode, where the motor is used to generate electricity. In regenerative mode, the electric motors act as brakes, slowing or retarding the vehicle. The electricity generated by the motors in the braking process can then either be stored in a battery or discarded as waste heat.

As a result of this propulsion system, mechanical brakes on a diesel electric vehicle have two main functions. First, the mechanical brakes may serve as emergency brakes. To that end, in case of electrical or motor failure, the mechanical brakes must be able to stop an overloaded vehicle moving at full speed. The vehicles are required to meet the requirements of the ISO 3450 specification. Second, the mechanical brakes may provide final braking of the vehicle. In this regard, at low speed (e.g., under 10 km/hr), the electric motors are not as effective at retarding or slowing the vehicle. Thus, the mechanical brakes are used to bring the vehicle to a complete stop. Typically, these stops are very low energy.

Conventional mechanical brakes used on diesel electric vehicles have one of two designs. Typically, for small to medium sized trucks (e.g., less than or equal to approximately 200-300 tons), dry caliper brakes are typically used. Such brakes consist of a caliper, a set of pads, and a steel or cast iron rotor. While these brakes may be relatively inexpensive, high wear rates can require the pads to be replaced as frequently as every 6-12 months. Moreover, these brakes are not capable of passing the ISO 3450 emergency stop specification, when used for heavier vehicles. In this regard, when energies and temperatures become undesirably high, increased wear and/or coefficient fade result.

For medium to large sized trucks (e.g., greater than or equal to approximately 200-300 tons), wet brakes are typically used. Such brakes consist of a pack of friction discs and steel opposing plates. The friction discs include a paper-based friction material bonded to both sides of a steel core. Grooves are also cut into the friction material to aid in oil flow and distribution. The friction discs may include a spline cut into the inner diameter, while the steel opposing plates may include a spline cut into the outer diameter. Typically, the friction discs rotate, while the opposing plates do not. The discs are enclosed in a housing with an actuating piston on one side. The housing may be partially filled with oil, or oil may be circulated through the housing by a pump. When braking is desired, the piston is actuated, thereby compressing all of the friction and opposing discs to create braking torque. While these brakes may have a relatively long life and may readily pass the ISO 3450 specification and emergency stops, parasitic drag caused by the oil flow in the brake when the brake is disengaged can rob the engine of horsepower and result in decreased fuel efficiencies. Moreover, these brakes are significantly larger and more complex than dry caliper brakes, requiring oil pumps, reservoirs, heat exchangers, and other componentry, thereby resulting in greater expense and weight.

Thus, there is a need for an improved brake system for off-highway equipment vehicles such as mine trucks that overcome drawbacks of conventional brake systems discussed above.

SUMMARY

In one embodiment, a brake system for a piece of equipment having a frame and a shaft rotatable relative to the frame includes a series of rotors and stators, including a plurality of rotors configured to be operatively coupled to the shaft and configured to rotate with the shaft relative to the frame, and a plurality of stators configured to be operatively coupled to the frame and configured to be fixed against rotation relative to the frame. The brake system also includes a first brake actuator including at least one first piston positioned within a first chamber such that pressurization of the first chamber causes the at least one first piston to operatively engage at least one of the rotors or stators such that the rotors and stators are compressed together and thereby create braking torque. The brake system may further include a second brake actuator including at least one spring operatively coupled to at least one second piston positioned within a second chamber such that depressurization of the second chamber causes the at least one second piston to operatively engage at least one of the rotors or stators such that the rotors and stators are compressed together and thereby create braking torque.

In one embodiment, at least one of the rotors or stators includes a monolithic piece. In another embodiment, at least one of the rotors or stators includes carbon-carbon. The plurality of stators may be arranged in an alternating sequence with the plurality of rotors.

In another embodiment, the brake system further includes a hub configured to be mounted to the shaft for rotation therewith, wherein the plurality of rotors are configured to be operatively coupled to the shaft via the hub. Each of the plurality of rotors may include at least one of a key or a keyway and the hub may include at least one of the other of a key or a keyway for engaging the at least one key or keyway of the rotors for causing the plurality of rotors to rotate with the hub and the shaft.

In one embodiment, the brake system further includes a housing configured to be mounted to the frame and fixed against rotation relative thereto, wherein each of the plurality of stators includes at least one of a notch or a ridge and the housing includes at least one of the other of a notch or a ridge for engaging the at least one notch or ridge of the stators for fixing the plurality of stators against rotation relative to the frame.

In another embodiment, the brake system further includes a load distribution plate positioned between the at least one first piston and the series of rotors and stators for providing an even compression of the pluralities of rotors and stators when the at least one first piston operatively engages the at least one of the rotors or stators. In one embodiment, the pluralities of rotors and stators are configured to be free from oil flow.

In yet another embodiment, a piece of equipment includes a frame, a shaft rotatable relative to the frame and a brake system. The brake system includes a series of rotors and stators, including a plurality of rotors operatively coupled to the shaft and rotatable with the shaft relative to the frame, and a plurality of stators operatively coupled to the frame and fixed against rotation relative to the frame. The brake system also includes a first brake actuator including at least one first piston positioned within a first chamber such that pressurization of the first chamber causes the at least one first piston to operatively engage at least one of the rotors or stators such that the rotors and stators are compressed together and thereby create braking torque for resisting rotation of the shaft relative to the frame. The brake system may further include a second brake actuator including at least one spring operatively coupled to at least one second piston positioned within a second chamber such that depressurization of the second chamber causes the at least one second piston to operatively engage at least one of the rotors or stators such that the rotors and stators are compressed together and thereby create braking torque for resisting rotation of the shaft relative to the frame.

In one embodiment, the shaft is an axle. In another embodiment, the shaft is a spindle. The piece of equipment may further include at least one wheel mounted to the shaft and rotatable therewith.

In one embodiment, at least one of the rotors or stators includes a monolithic piece. In another embodiment, at least one of the rotors or stators includes carbon-carbon. The plurality of stators may be arranged in an alternating sequence with the plurality of rotors.

In still another embodiment, a brake system for a piece of equipment having a frame includes a series of rotors and stators, including a plurality of rotors configured to be rotatable relative to the frame, and a plurality of stators configured to be operatively coupled to the frame and configured to be fixed against rotation relative to the frame. The brake system also includes a first brake actuator including at least one first piston positioned within a first chamber such that pressurization of the first chamber causes the at least one first piston to operatively engage at least one of the rotors or stators such that the rotors and stators are compressed together and thereby create braking torque. The brake system may also include a second brake actuator including at least one spring operatively coupled to at least one second piston positioned within a second chamber such that depressurization of the second chamber causes the at least one second piston to operatively engage at least one of the rotors or stators such that the rotors and stators are compressed together and thereby create braking torque.

DETAILED DESCRIPTION

Figure 1:
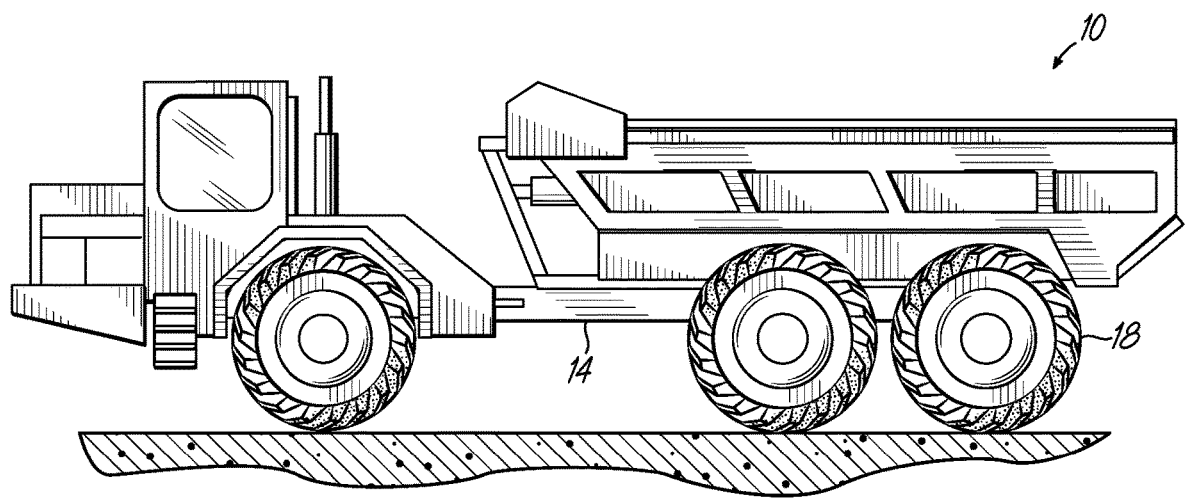
FIG. 1 is a side elevation view of a mine truck including an exemplary brake system in accordance with the principles of the present invention.
Figure 2:
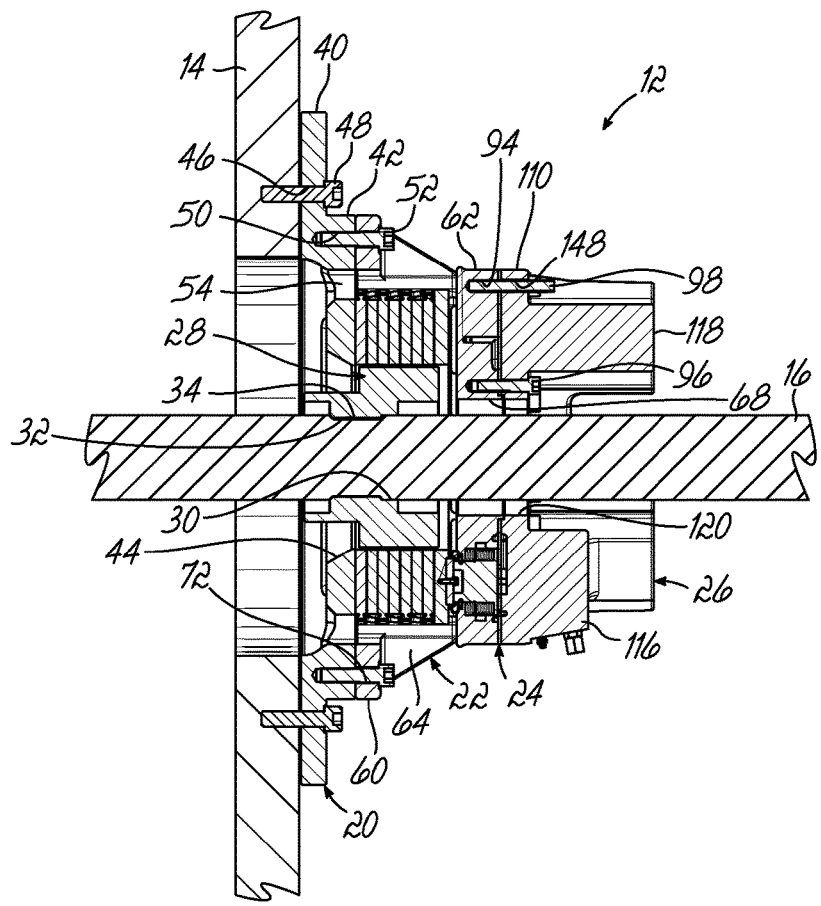
FIG. 2 is a detail cross sectional view of the mine truck of FIG. 1, showing the exemplary brake system coupled to the frame and rotatable shaft of the mine truck.

Referring now to the drawings, and to FIGS. 1 and 2 in particular, an off-highway equipment vehicle, such as a mine truck 10 configured as a diesel electric vehicle, includes an exemplary brake system 12 in accordance with the principles of the present invention. While a mine truck 10 is shown, the brake system 12 may be configured for use on any suitable off-highway equipment vehicle or other piece of equipment, such as a continuous track vehicle. The illustrated mine truck 10 includes a frame 14, a shaft 16 such as a front or rear axle or spindle rotatable relative to the frame 14, and at least one wheel 18 mounted to the shaft 16 for rotating therewith. As set forth in greater detail below, various components of the brake system 12 are operatively coupled to the frame 14 and/or to the shaft 16 for providing resistance to rotation of the shaft 16 and wheel 18, and thus to movement of the mine truck 10. The brake system 12 may provide improved braking performance with many of the advantages of a wet brake while avoiding many of the disadvantages of a wet brake. For example, the brake system 12 may exhibit a low wear rate, and thus a long life, without the parasitic drag caused by oil in wet brakes and with reduced complexity, weight, and cost. The features of the brake system 12 are set forth in further detail below to clarify each of these functional advantages and other benefits provided in this disclosure.

Figure 3:
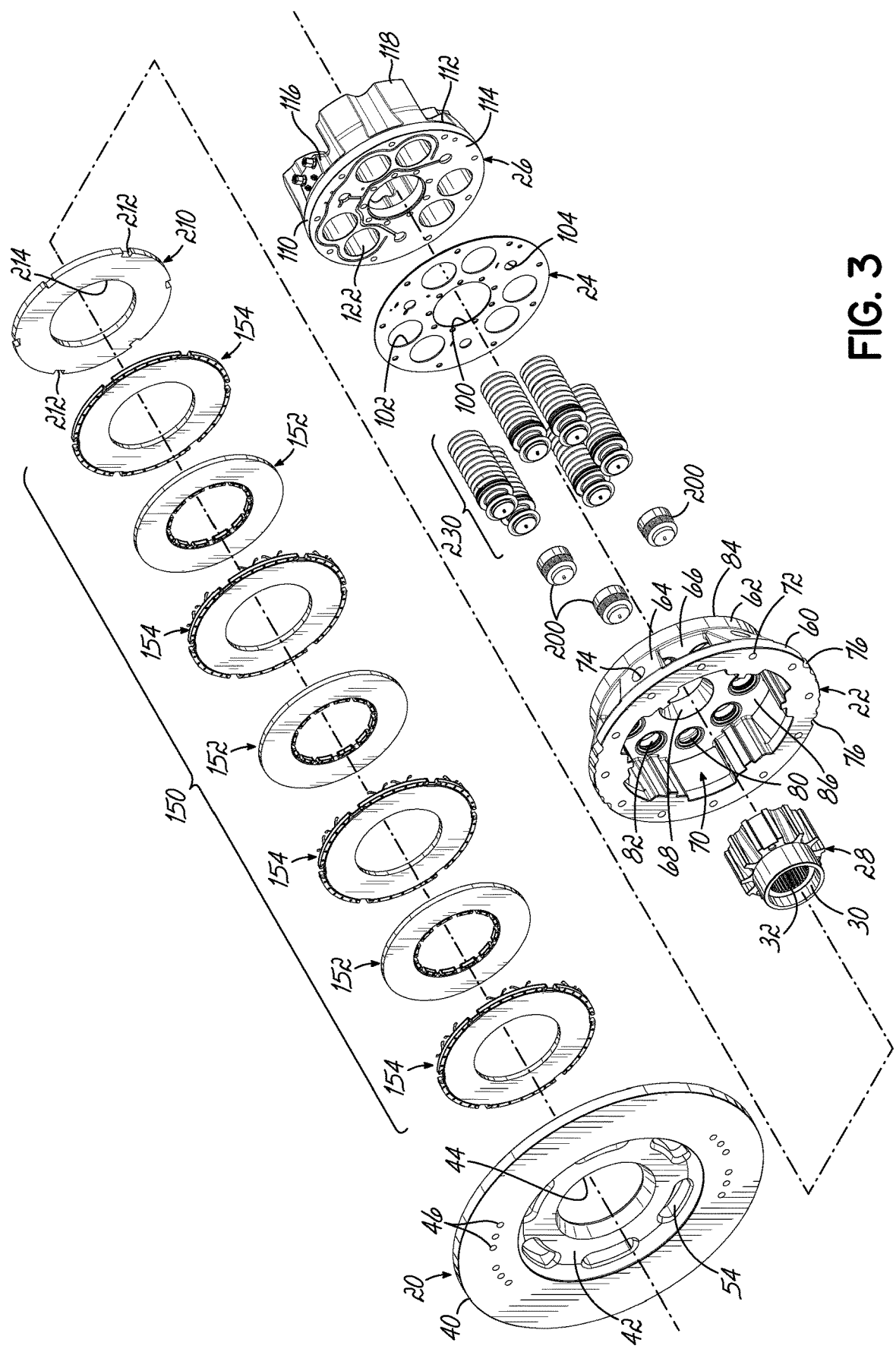
FIG. 3 is an exploded view of the brake system of FIG. 2.

Referring now to FIGS. 2 and 3, the brake system 12 includes a base portion 20, a cage portion 22, a hydraulic separator plate 24, and a cap portion 26 fixedly coupled together to form a housing and configured to be mounted to the frame 14 of the mine truck 10, as well as a hub 28 configured to be mounted to the shaft 16. To that end, the hub 28 includes a central bore 30 having splines 32 for mechanically engaging corresponding splines 34 of the shaft 16 such that the hub 28 may rotate with rotation of the shaft 16.

The illustrated base portion 20 includes a generally annular plate 40 and a generally annular platform 42 extending from the plate 40 toward the cage portion 22 and defining a central bore 44 for receiving the shaft 16 of the mine truck 10. The base portion 20 is configured to be operatively coupled to the frame 14 of the mine truck 10 so as to be fixed against movement relative to the frame 14. To that end, the illustrated base portion 20 includes a plurality of through-bores 46 provided in the plate 40 for receiving fasteners, such as threaded bolts 48, to couple the base portion 20 to the frame 14. Notches (not shown) may be provided in the periphery of the platform 42 for accommodating the heads of the threaded bolts 48. The illustrated base portion 20 also includes a plurality of threaded blind bores 50 provided in the platform 42 for threadably receiving fasteners, such as threaded bolts 52, to couple the cage portion 22 to the base portion 20. As shown, the platform 42 may include a plurality of air flow slots 54 at or near its periphery, for reasons discussed below.

The illustrated cage portion 22 includes a lower ring 60 and an upper body 62 spaced apart and coupled together by a plurality of supports 64 separated from each other by openings 66. The upper body 62 is generally annular and defines a central bore 68 for alignment with the central bore 44 of the base portion 20 and to receive the shaft 16 of the mine truck 10. Together, the lower ring 60, upper body 62, and supports 64 define a generally interior space 70 for receiving the hub 28 and/or other components, which may be at least partially enclosed on the side adjacent the lower ring 60 by the platform 42 of the base portion 20. To that end, the lower ring 60 of the cage portion 22 includes a plurality of through-bores 72 for receiving the threaded bolts 52 for coupling with the base portion 20. As shown, a portion of the through-bores 72 extend through the supports 64, and counterbores 74 may be provided in the supports 64 concentric with such through-bores 72 for receiving the heads of the threaded bolts 52 which couple the cage portion 22 to the base portion 20. In addition or alternatively, notches 76 may be provided in the periphery of the lower ring 60 for accommodating the heads of the threaded bolts 48 which couple the base portion 20 to the frame 14.

Figure 4:
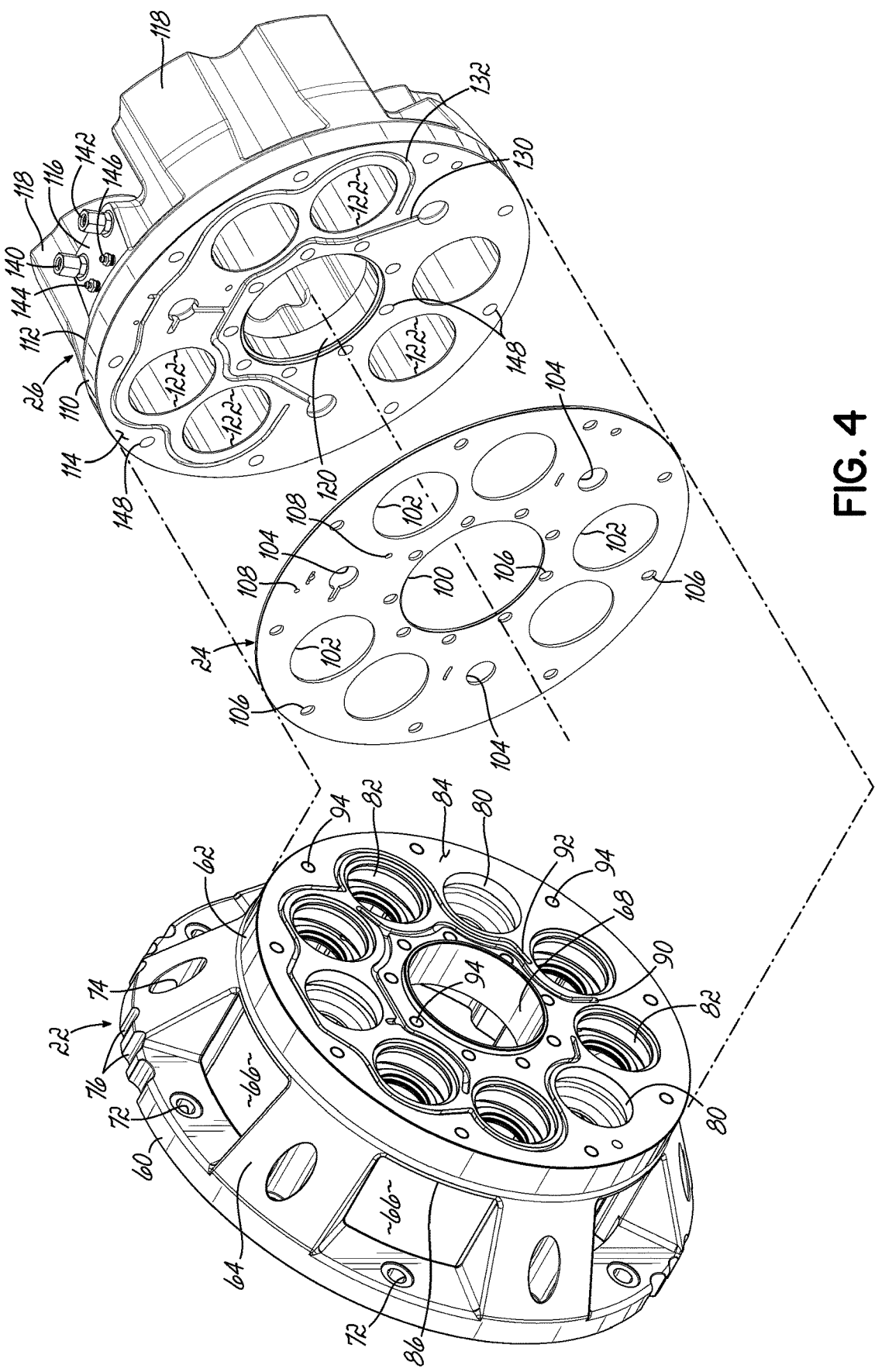
FIG. 4 is a partial exploded view of the brake system of FIG. 2, showing the hydraulic fluid pathways of the brake system.

Referring now to FIG. 4, with continuing reference to FIGS. 2 and 3, the upper body 62 of the cage portion 22 includes pluralities of first and second chambers 80, 82 extending between first and second surfaces 84, 86 of the upper body 62 such that each chamber 80, 82 is open to each of the first and second surfaces 84, 86. In the illustrated cage portion 22, the plurality of first chambers 80 includes three first chambers 80 and the plurality of second chambers 82 includes six second chambers 82, arranged in pairs between the first chambers 80. However, it will be appreciated that other numbers and/or arrangements of the chambers 80, 82 may be used. As shown, first and second fluid bleeder pathways 90, 92 extend along the first surface 84 of the upper body 62 for bleeding hydraulic fluid from the pluralities of first and second chambers 80, 82, respectively. The functions and purposes of the chambers 80, 82 and fluid bleeder pathways 90, 92 are discussed in greater detail below. In any event, the illustrated cage portion 22 includes a plurality of threaded blind bores 94 provided in the upper body for threadably receiving fasteners, such as threaded bolts 96 and/or threaded studs 98, to couple the separator plate 24 and/or cap portion 26 to the cage portion 22.

As shown, the separator plate 24 is generally annular and defines a central bore 100 for alignment with the central bores 44, 68 of the base and cage portions 20, 22 and to receive the shaft 16 of the mine truck 10. The separator plate 24 includes a plurality of chamber bores 102 configured for alignment with the plurality of second chambers 82 of the cage portion 22, and a plurality of fluid supply openings 104 for alignment with the plurality of first chambers 80, such that the separator plate 24 partially covers each of the first chambers 80 and the fluid supply openings 104 allow hydraulic fluid to enter each of the first chambers 80 from a side of the separator plate 24 opposite the cage portion 22. The illustrated separator plate 24 further includes a plurality of through bores 106 for receiving the threaded bolts 96 and/or threaded studs 98 which couple the separator plate 24 to the cage portion 22 and/or cap portion 26.

When coupled to the upper body 62 of the cage portion 22, the separator plate 24 bounds the first and second fluid bleeder pathways 90, 92 in the first surface 84 of the upper body 62 to generally retain hydraulic fluid therein. As shown, the separator plate 24 includes fluid bleeder openings 108 for allowing hydraulic fluid to exit the first and second fluid bleeder pathways 90, 92 to the side of the separator plate 24 opposite the cage portion 22.

The illustrated cap portion 26 includes a generally annular plate 110 having first and second surfaces 112, 114 and pluralities of first and second towers 116, 118 extending from the second surface 114 away from the cage portion 22. The plate 110 defines a central bore 120 for alignment with the central bores 44, 68, 100 of the base portion 20, cage portion 22, and separator plate 24, and to receive the shaft 16 of the mine truck 10. Pairs of blind bores 122 extend from the second surface 114 of the plate 110 into each of the second towers 118 and are configured for alignment with the chamber bores 102 of the separator plate 24 and the second chambers 82 of the cage portion 22. As shown, first and second fluid supply pathways 130, 132 extend along the second surface 114 of the plate 110 for supplying hydraulic fluid to the pluralities of first and second chambers 80, 82, respectively. First and second hydraulic fluid inlet ports 140, 142 are provided in one of the first towers 116 and fluidically communicate with the first and second fluid supply pathways 130, 132, respectively. Similarly, first and second hydraulic fluid bleeder ports 144, 146 are provided in one of the first towers 116 and fluidically communicate with the first and second fluid bleeder pathways 90, 92, respectively.

As shown, the cap portion 26 includes a plurality of through bores 148 provided in the plate 110 for receiving the threaded bolts 96 and/or threaded studs 98 which couple the cap portion 26 to the separator plate 24 and/or cage portion 22. When the cap portion 26 is coupled to the separator plate 24, the separator plate 24 bounds the first and second fluid supply pathways 130, 132 in the second surface 114 of the plate 110 to generally retain hydraulic fluid therein. The fluid supply openings 104 in the separator plate 24 allow fluid to travel from the fluid inlet ports 140, 142 to the corresponding chambers 80, 82.

Figure 5:
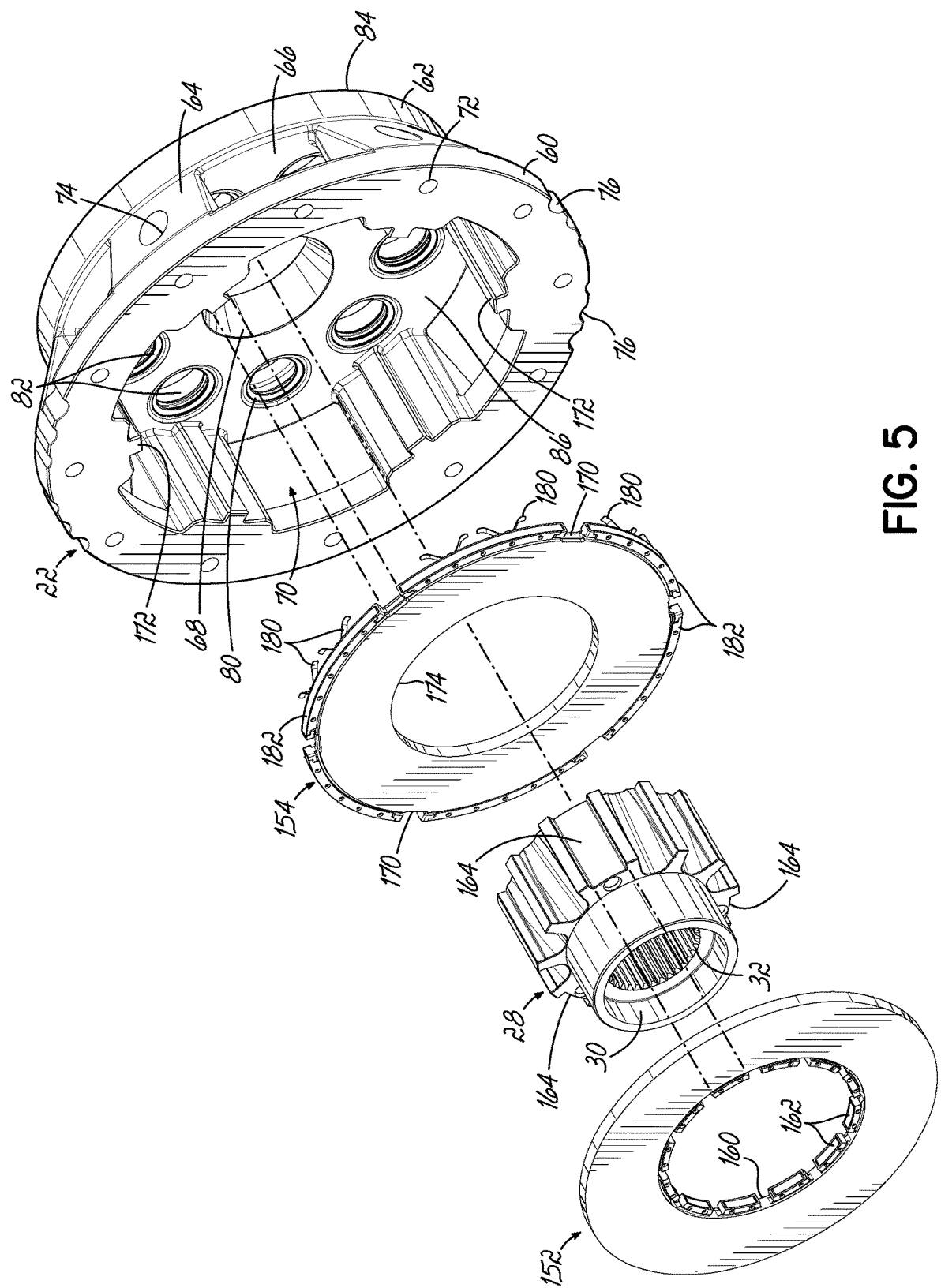
FIG. 5 is a partial exploded view of the brake system of FIG. 2, showing various interlocking features of the brake system.

Referring now to FIG. 5, with continuing reference to FIGS. 2 and 3, the brake system 12 includes a series or pack 150 of generally disc-shaped rotors 152 and stators 154 housed within the interior space 70 of the cage portion 22. The rotors 152 are operatively coupled to the shaft 16 and configured to rotate with the shaft 16 relative to the frame 14. To that end, the rotors 152 each include a central bore 160 having a plurality of keys 162 configured to be received by corresponding keyways 164 of the hub 28. When the shaft 16 and hub 28 rotate together, the keyways 164 may mechanically engage the corresponding keys 162, thereby causing the rotors 152 to rotate with the hub 28 and shaft 16. It will be appreciated that the rotors 152 may be coupled to the shaft 16 in various other ways without departing from the scope of the invention.

The stators 154 are operatively coupled to the frame 14 and configured to be fixed against rotation relative to the frame 14. To that end, the stators 154 each include notches 170 along their outer peripheries for receiving corresponding ridges 172 of the cage portion 22, and a central bore 174 sized to clear the hub 28. In this manner, when the shaft 16 rotates, the engagement between the ridges 172 and the notches 170 may prevent the stators 154 from rotating relative to the frame 14, while the hub 28 and/or shaft 16 may rotate freely within the central bore 174. In the embodiment shown, the ridges 172 are provided on inner surfaces of the supports 64 of the cage portion 22. It will be appreciated that the stators 154 may be coupled to the frame 14 in various other ways without departing from the scope of the invention.

The rotors 152 and stators 154 are free to move slightly along the axis of the shaft 16 such that, when the rotors 152 and stators 154 are spaced apart from each other, the rotors 152 are permitted to rotate freely with the shaft 16 and such that, when the rotors 152 and stators 154 are compressed or clamped together, braking torque may be created by friction generated between the rotors 152 and stators 154 to thereby resist rotation of the rotors 152. In that regard, each of the rotors 152 and/or stators 154 may be constructed of a friction material suitable for braking applications. For example, the rotors 152 and/or stators 154 may comprise monolithic pieces of carbon fiber reinforcement in a matrix of carbon, commonly referred to as carbon fiber-reinforced carbon or carbon-carbon. It will be appreciated that carbon-carbon may exhibit a low wear rate and thus provide durability to the rotors 152 and stators 154, and that a monolithic construction may allow a substantial portion of the thickness of each rotor 152 and stator 154 to be available as usable material during braking. However, any other suitable material and/or suitable construction (e.g., non-monolithic) may be used for the rotors 152 and/or stators 154. For example, the rotors 152 and/or stators 154 may include a sintered metallic-based friction material bonded to both sides of a steel core or manufactured into a monolithic piece. In one embodiment, the pluralities of rotors 152 and stators 154 are configured to be free from oil flow during use. In any event, the braking torque created by compressing the rotors 152 and stators 154 may be transferred from the rotors 152 to the hub 28 via the keys 162 and keyways 164, and may be transferred from the hub 28 to the shaft 16 via the splines 32, 34 to resist rotation of the shaft 16 and wheel 18.

It will be appreciated that substantial heat may be generated during the creation of braking torque by the rotors 152 and stators 154. The air flow slots 54 in the platform 42 of the base portion 20 may assist in transferring such away from the brake system 12. In addition or alternatively, the openings 66 between the supports 64 of the cage portion 22 may assist in transferring the heat away from the brake system 12.

As shown, generally V-shaped flat springs 180 may be positioned between adjacent stators 154 at or near their peripheries to bias the stators 154 away from each other and thereby prevent the stators 154 from inadvertently clamping a rotor 152 therebetween when braking torque is not desired, which would lead to parasitic drag. For example, the flat springs 180 may be coupled to peripheral metallic clips 182 positioned over the stators 154. Such clips 182 may be load-bearing in order to avoid damaging the stators 154 under loads carried between the stators 154 by the flat springs 180. In the embodiment shown, three rotors 152 and four stators 154 are arranged in an alternating sequence starting and ending with a stator 154. However, various other numbers of rotors and stators may be arranged in any suitable sequence. For example, four rotors and five stators may be arranged in an alternating sequence. In one embodiment, each front wheel of the mine truck may be equipped with a brake system having a greater number of rotors and stators than the brake systems of the rear wheels due to reduced torque requirements for the rear wheels, such as when the rear brake systems operate behind a gear box. For example, the rear brake system may contain three rotors and four stators, while the front brake system may contain four rotors and five stators.

Figure 6:
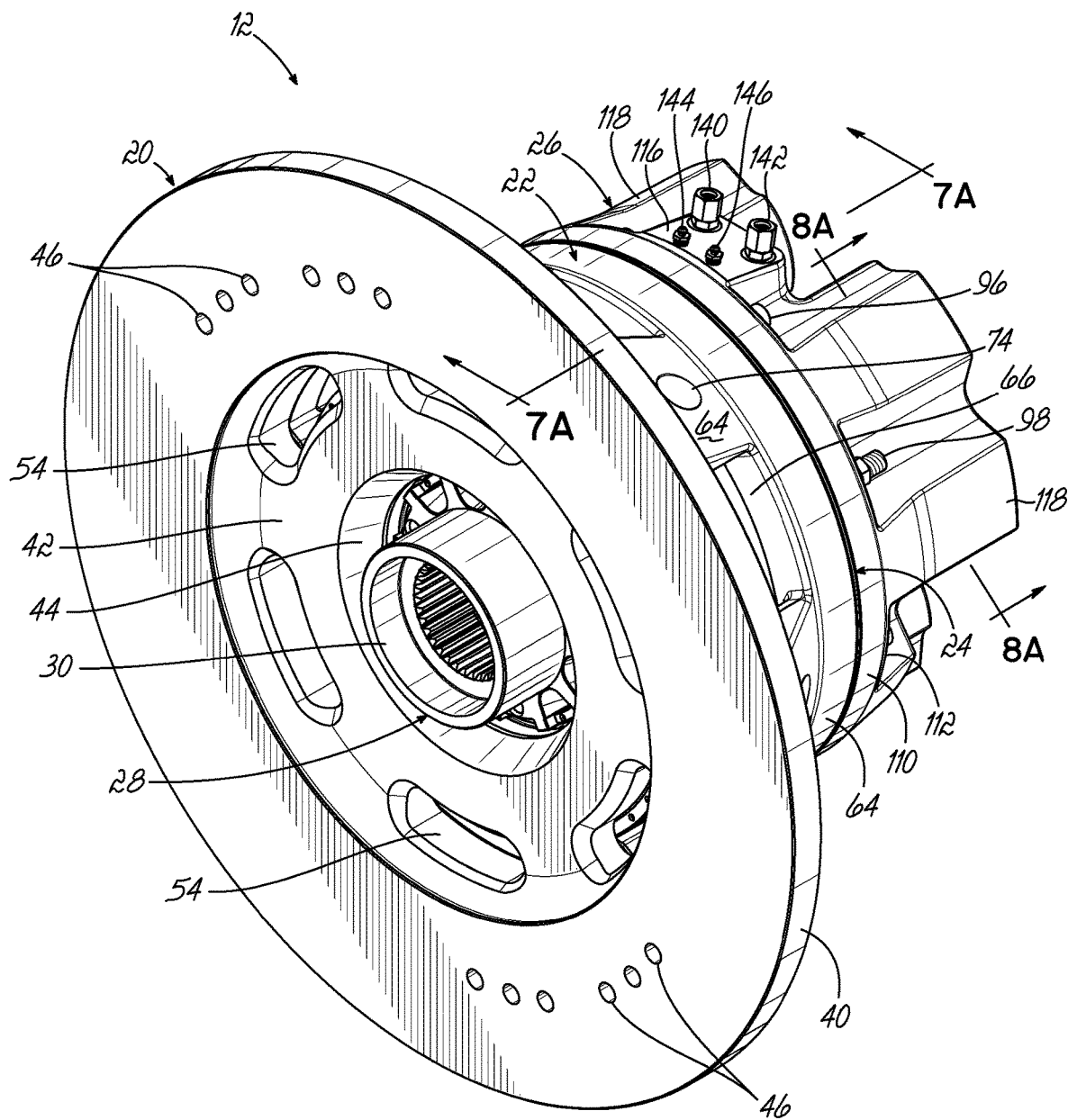
FIG. 6 is a perspective view of the brake system of FIG. 2.
Figure 7A:
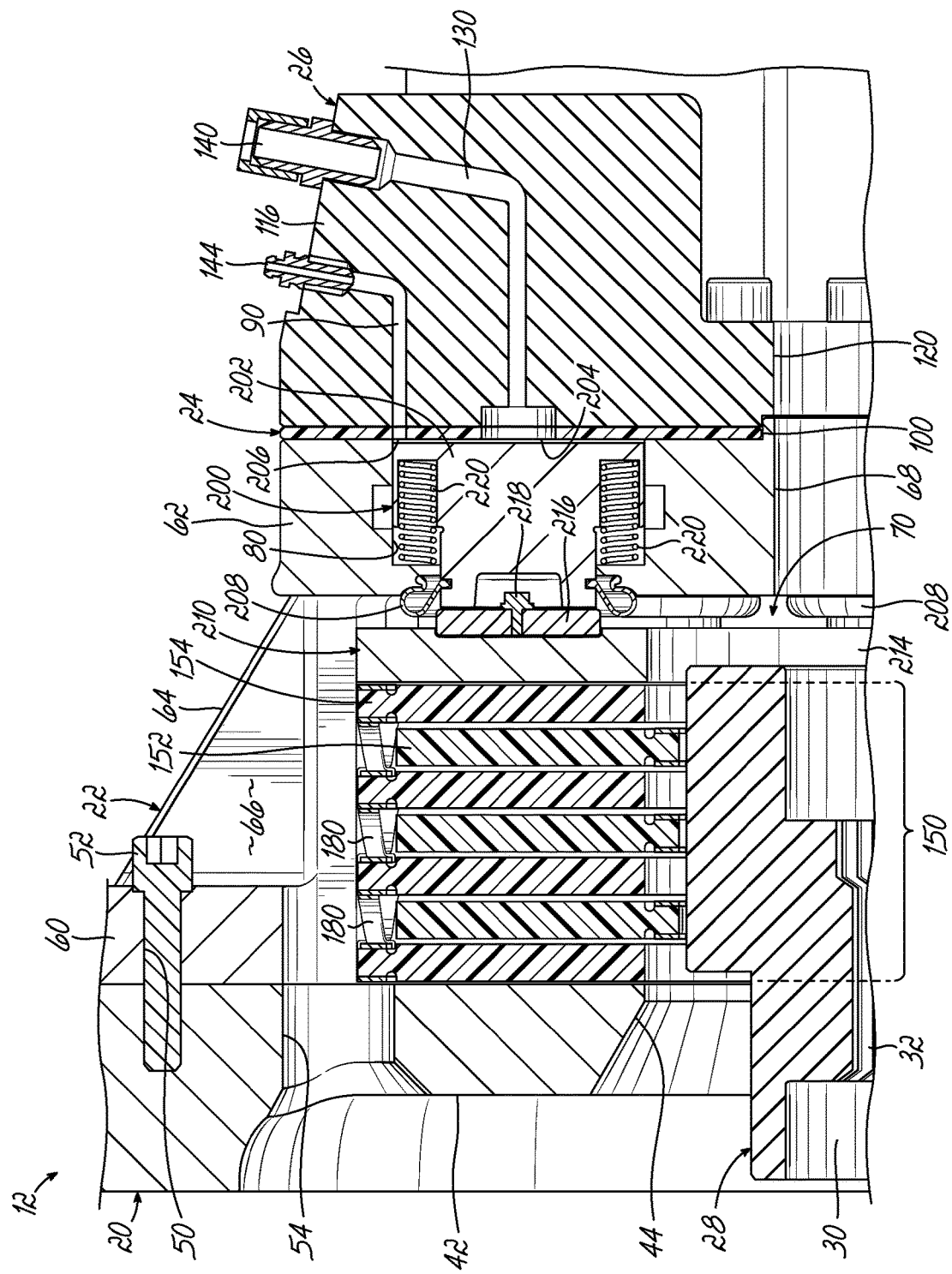
FIG. 7A is a cross sectional view taken along section line 7A-7A of FIG. 6, showing a first piston of the brake system in a retracted position.
Figure 7B:
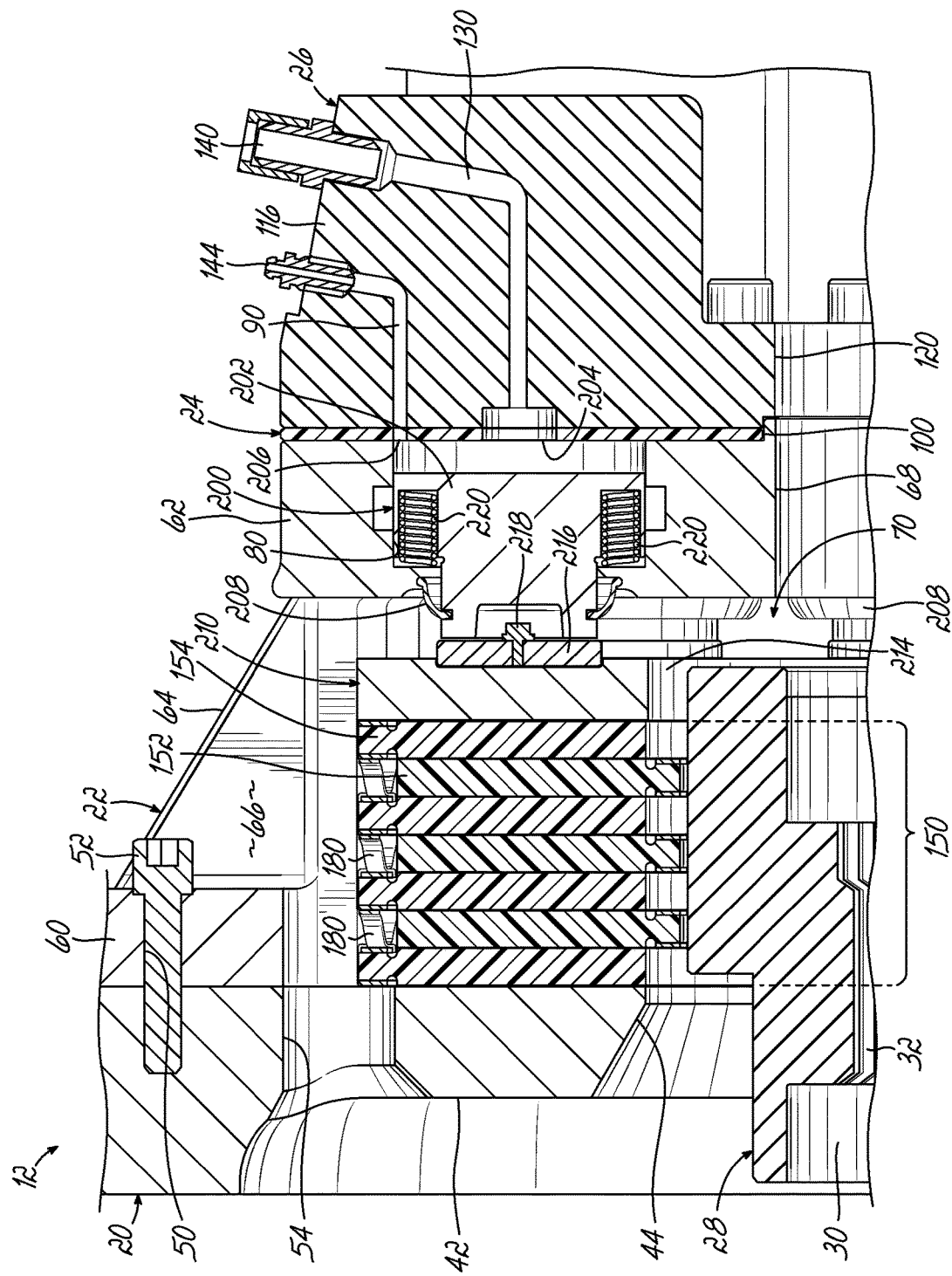
FIG. 7B is a cross sectional view similar to FIG. 7A, showing the first piston in an expanded position.

Referring now to FIGS. 6, 7A, and 7B, with continuing reference to FIG. 3, the brake system 12 includes a service brake actuator 200 which may be used to compress the rotors 152 and stators 154 together during operation of the mine truck 10. In the embodiment shown, the service brake actuator 200 includes three first pistons 202 positioned within the three first chambers 80 of the cage portion 22. First fluid inlets and outlets 204, 206 in fluid communication with the first fluid supply and bleeder pathways 130, 90, respectively, are provided on a side of each first piston 202 opposite the rotors 152 and stators 154, such that pressurization of the first chambers 80 with hydraulic fluid via the first fluid supply pathway 130 causes the first pistons 202 to expand from a retracted position (FIG. 7A) toward the rotors 152 and stators 154 to an expanded position (FIG. 7B). While not shown, it will be appreciated that pressurization of the first chambers 80 may be achieved by opening a valve via a controller, such as a brake pedal, to allow hydraulic fluid to flow from a reservoir through the first fluid supply pathway 130 to the first chambers 80. As shown, a gasket 208 may be provided between each first piston 202 and respective first chamber 80 in order to prevent hydraulic fluid leakage into the interior space 70 of the cage portion 22. In any event, when in the expanded position, the first pistons 202 may operatively engage at least one of the rotors 152 and/or stators 154 to compress or clamp the rotors 152 and stators 154 together against the platform 42 of the base portion 20 to create braking torque for resisting rotation of the shaft 16.

In the embodiment shown, a load distribution plate 210 is positioned between the first pistons 202 and the pack 150 of rotors 152 and stators 154, such that the operative engagement between the first pistons 202 and the rotor(s) 152 and/or stator(s) 154 is accomplished via the load distribution plate 210. The load distribution plate 210 may be fixed against rotation relative to the frame 14, and may be somewhat similar to a stator 154. In particular, the load distribution plate 210 may include notches 212 along its outer periphery (FIG. 3) for receiving corresponding ridges 172 of the cage portion 22, and a central bore 214 sized to clear the hub 28. In this manner, the load distribution plate 210 may provide generally even compression of the rotors 152 and stators 154 across their respective surface areas for a consistent and reliable braking torque. In addition or alternatively, thermal barrier discs 216 may be coupled to the first pistons 202 via fasteners, such as threaded bolts 218, in order to insulate the first pistons 202 and chambers 80 from the heat generated during the creation of braking torque.

As shown, pluralities of springs 220 are provided between each of the first pistons 202 and surfaces of the respective first chambers 80 on a same side of the first pistons 202 as the rotors 152 and stators 154 in order to bias the first pistons 202 away from the rotors 152 and stators 154. Thus, a threshold pressurization of the first chambers 80 may be required to overcome the bias of the springs 220 in order to expand the first pistons 202 toward the rotors 152 and stators 154. This may prevent the first pistons 202 from inadvertently compressing the rotors 152 and stators 154 together, and these springs 220 provide residual pressure to allow operation of a hydraulic slack adjuster to adjust piston stroke for ideal application delay based on friction wear. When the first chambers 80 are depressurized, such as by reducing or stopping fluid flow in the first fluid supply pathway 130 and allowing pressure to exit through the first fluid inlet 204, the first pistons 202 may be urged by the springs 220 away from the rotors 152 and stators 154, and the flat springs 180 may urge the stators 154 away from each other to unclamp the rotors 152 and cease creating braking torque.

Figure 8A:
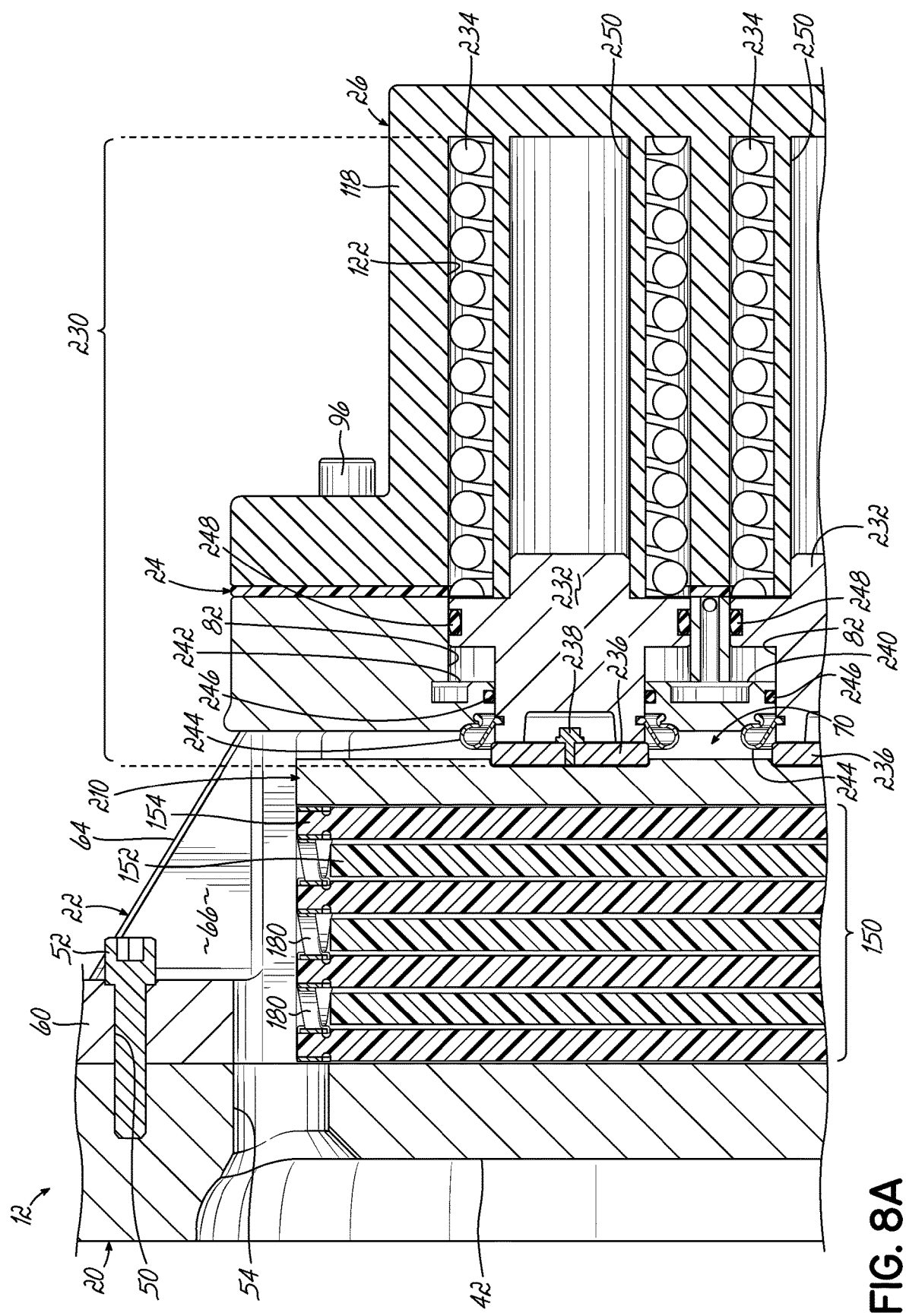
FIG. 8A is a cross sectional view taken along section line 8A-8A of FIG. 6, showing a second piston of the brake system in an expanded position.
Figure 8B:
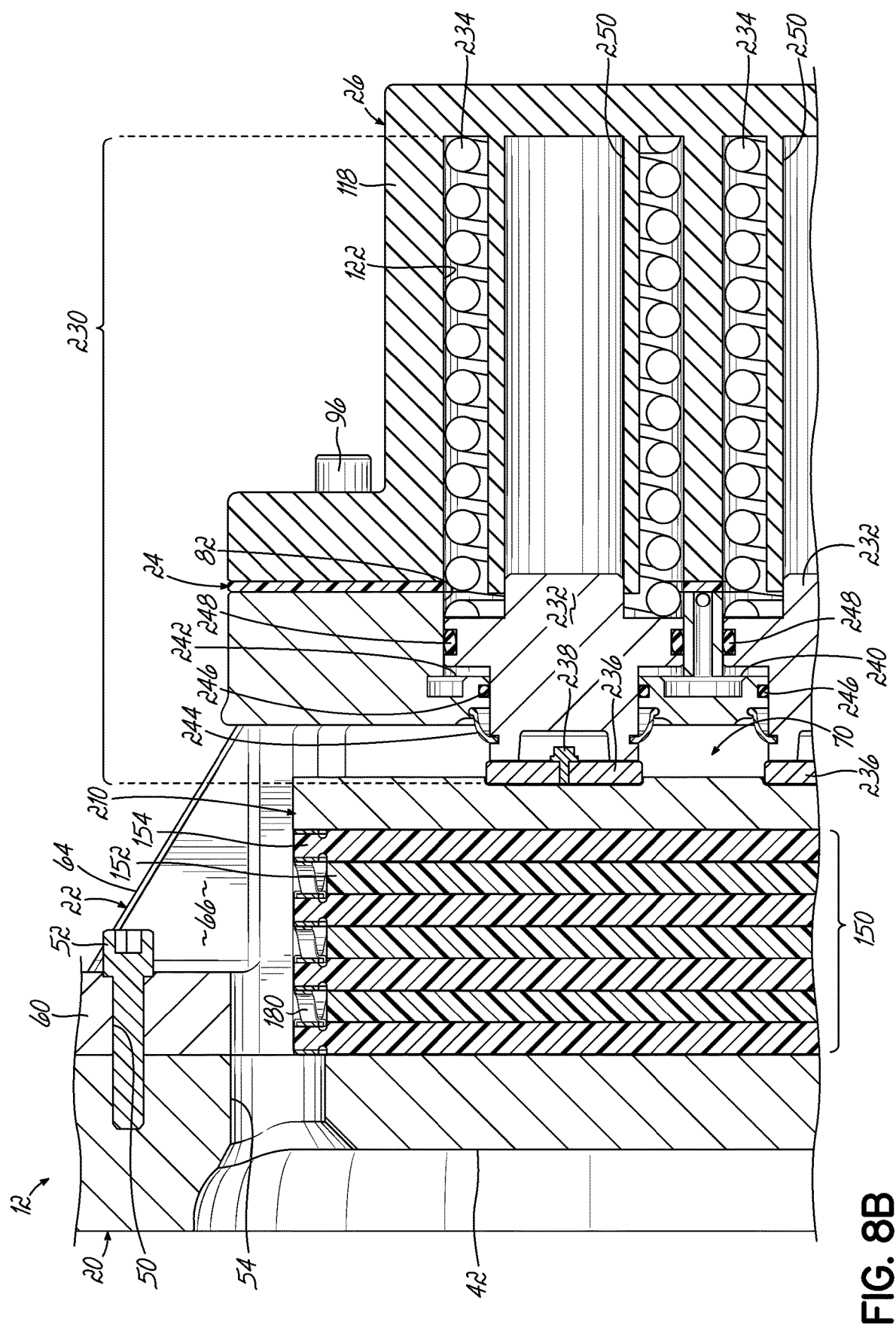
FIG. 8B is a cross sectional view similar to FIG. 8A, showing the second piston in a retracted position.

Referring now to FIGS. 8A and 8B, with continuing reference to FIGS. 3 and 6, the brake system 12 further includes an emergency or parking brake actuator 230 which may be used to compress the rotors 152 and stators 154 together during operation of the mine truck 10, such as in an emergency situation, or when the mine truck 10 is out of use. In one embodiment, the parking brake actuator 230 may include a spring-applied hydraulic-released (SAHR) brake. As shown, the parking brake actuator 230 includes six second pistons 232 positioned within six corresponding second chambers 82 of the cage portion 22, and six springs 234 positioned over the second pistons 232 within blind bores 122 of the three corresponding towers 118 in order to bias the second pistons 232 toward the rotors 152 and stators 154. In this manner, the second pistons 232 may operatively engage at least one of the rotors 152 and/or stators 154 to compress or clamp the rotors 152 and stators 154 together against the platform 42 of the base portion 20 to create braking torque for resisting rotation of the shaft 16.

In the embodiment shown, the load distribution plate 210 is positioned between the second pistons 232 and the series of rotors 152 and stators 154 in a manner similar to that discussed above with respect to the service brake actuator 200. In addition or alternatively, thermal barrier discs 236 may be coupled to the second pistons 232 via fasteners 238 in order to insulate the second pistons 232 and chambers 82 from the heat generated during the creation of braking torque.

Second fluid inlets and outlets 240, 242 in fluid communication with the second fluid supply and bleeder pathways 132, 92, respectively, are provided on a same side of each second piston 232 as the rotors 152 and stators 154, such that pressurization of the second chambers 82 with hydraulic fluid via the second fluid pathway 132 sufficient to overcome the bias of the springs 234 causes the second pistons 232 to expand away from the rotors 152 and stators 154. During normal operation of the mine truck 10, the second chambers 82 may be pressurized to maintain the second pistons 232 in the expanded position (FIG. 8A) to prevent the second pistons 232 from inadvertently compressing the rotors 152 and stators 154 together. When parking the mine truck 10 or during an emergency situation, the second chambers 82 may be depressurized, allowing the springs 234 to urge the second pistons 232 toward the rotors 152 and stators 154 to create braking torque (FIG. 8B). While not shown, it will be appreciated that depressurization of the second chambers 82 may be achieved by closing a valve via a controller, such as a parking brake lever, to slow or prevent hydraulic fluid flow from a reservoir through the second fluid supply pathway 132 to the second chambers 82. As shown, gaskets 244 may be provided between each second piston 232 and respective second chamber 82 in order to prevent hydraulic fluid leakage into the interior space 70 of the cage portion 22. In addition or alternatively, one or more O-rings 246, 248 may be provided between each second piston 232 and respective chamber 82 to provide a fluid-tight seal therebetween.

In the embodiment shown, columns 250 are provided within each blind bore 122 of the towers 118 and are generally concentric with the respective springs 234. The outer surfaces of the columns 250 may provide centering for the springs 234 and guide the springs 234 during compression and/or expansion thereof. In addition or alternatively, the columns 250 may be at least partially hollow, and the inner surfaces of the columns 250 may guide the second pistons 232 during retraction and/or expansion thereof. The end surfaces of the columns 250 proximate to the respective second pistons 232 may limit the expansion of the second pistons 232 to stop the second pistons 232 before the springs 234 become over-compressed and/or damaged.

Thus, the brake system 12 may provide improved braking performance with many of the advantages of a wet brake while avoiding many of the disadvantages of a wet brake. For example, the brake system 12 may exhibit a low wear rate, and thus a long life. The absence of oil in the interior space 70 of the cage portion 22 and/or on the rotors 152 and stators 154 avoids the parasitic drag caused by oil in wet brakes, and further avoids the need for complex and heavy oil circulation equipment.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. A brake system for a piece of equipment having a frame and a shaft rotatable relative to the frame, the brake system comprising:
a cage portion surrounding the shaft and defining a plurality of first chambers and second chambers arranged with each other around the cage portion;
a series of rotors and stators arranged in an alternating sequence in the cage portion, the plurality of rotors operatively coupled to the shaft and configured to rotate with the shaft relative to the frame, the plurality of stators operatively coupled to the frame and configured to be fixed against rotation relative to the frame;
each of the rotors and stators being a monolithic piece comprised of a carbon fiber-reinforced carbon material;
a load distribution plate positioned in the cage portion on one side of the alternating sequence of rotors and stators for directing forces on the rotors and stators;
a first brake actuator and a second brake actuator each positioned for applying force on the same side of the load distribution plate opposite the alternating sequence of rotors and stators;
the first brake actuator including a plurality of first pistons positioned within respective first chambers such that pressurization of the respective first chambers on a side of the first pistons opposite the load distribution plate causes the first pistons to operatively engage the load distribution plate for compression of the alternating sequence of rotors and stators such that the rotors and stators are compressed together and thereby create braking torque;
a second brake actuator including a plurality of second pistons positioned within respective second chambers and arranged on the same side of the load distribution plate as the plurality of first pistons, the second brake actuator including a plurality of springs operatively coupled to respective second pistons on a side of the second pistons opposite the load distribution plate for biasing the second pistons to operatively engage the load distribution plate for compression of the alternating sequence of rotors and stators for creating braking torque and further including fluid inlets on the same sides of the second pistons as the load distribution plate, such that pressurization of the second chambers can cause the second pistons to overcome the bias of the springs to prevent the compression of the alternating sequence of rotors and stators to remove braking torque.

2. The brake system of claim 1, further comprising:
a hub configured to be mounted to the shaft for rotation therewith, wherein the plurality of rotors are configured to be operatively coupled to the shaft via the hub.

3. The brake system of claim 2, wherein each of the plurality of rotors includes at least one of a key or a keyway and the hub includes at least one of the other of a key or a keyway for engaging the at least one key or keyway of the rotors for causing the plurality of rotors to rotate with the hub and the shaft.

4. The brake system of claim 1, further comprising:
a housing including the cage portion and configured to be mounted to the frame and fixed against rotation relative thereto, wherein each of the plurality of stators includes at least one of a notch or a ridge and the cage includes at least one of the other of a notch or a ridge for engaging the at least one notch or ridge of the stators for fixing the plurality of stators against rotation relative to the frame.

5. The brake system of claim 1, wherein
the load distribution plate is positioned between the plurality of first pistons and the series of rotors and stators.

6. The brake system of claim 1, wherein the pluralities of rotors and stators are configured to be free from oil flow.

7. The brake system of claim 1 wherein the first brake actuator includes at least one spring positioned between a first piston and a respective first chamber, the at least one spring positioned on a side of the piston proximate the load distribution plate for acting in a direction opposite to the pressurization of the first chamber.

8. A piece of equipment comprising:
a frame;
a shaft rotatable relative to the frame; and
a brake system comprising:
a cage portion surrounding the shaft and defining a plurality of first chambers and second chambers arranged with each other around the cage portion;
a series of rotors and stators arranged in an alternating sequence in the cage portion, the plurality of rotors operatively coupled to the shaft and rotatable with the shaft relative to the frame, the plurality of stators operatively coupled to the frame and fixed against rotation relative to the frame;
each of the rotors and stators being a monolithic piece comprised of a carbon fiber-reinforced carbon material;
a load distribution plate positioned in the cage portion on one side of the alternating sequence of rotors and stators for directing forces on the rotors and stators;
a first brake actuator and a second brake actuator each positioned for applying force on the same side of the load distribution plate opposite the alternating sequence of rotors and stators;
the first brake actuator including a plurality of first pistons positioned within respective first chambers such that pressurization of the respective first chambers on a side of the first pistons opposite the load distribution plate causes the first pistons to operatively engage the load distribution plate for compression of the alternating sequence of rotors and stators such that the rotors and stators are compressed together and thereby create braking torque;
a second brake actuator including a plurality of second pistons positioned within respective second chambers and arranged on the same side of the load distribution plate as the plurality of first pistons, the second brake actuator including a plurality of springs operatively coupled to respective second pistons on a side of the second pistons opposite the load distribution plate for biasing the second pistons to operatively engage the load distribution plate for compression of the alternating sequence of rotors and stators for creating braking torque and further including fluid inlets on the same sides of the second pistons as the load distribution plate, such that pressurization of the second chambers can cause the second pistons to overcome the bias of the springs to prevent the compression of the alternating sequence of rotors and stators to remove braking torque.

9. The piece of equipment of claim 8, wherein the shaft is an axle.

10. The piece of equipment of claim 8, wherein the shaft is a spindle.

11. The piece of equipment of claim 8, further comprising:
at least one wheel mounted to the shaft and rotatable therewith.

12. The piece of equipment of claim 8 wherein the first brake actuator includes at least one spring positioned between a first piston and a respective first chamber, the at least one spring positioned on a side of the piston proximate the load distribution plate for acting in a direction opposite to the pressurization of the first chamber.

13. A brake system for a piece of equipment having a rotatable shaft, the brake system comprising:
a housing surrounding the shaft and including a cage portion;
a series of rotors and stators arranged in an alternating sequence in the cage portion, the plurality of rotors operatively coupled to the shaft and configured to rotate with the shaft, the plurality of stators configured to be fixed against rotation relative to the rotors;
each of the rotors and stators being a monolithic piece comprised of a carbon fiber-reinforced carbon material;
a load distribution plate positioned on one side of the alternating sequence of rotors and stators for directing forces on the rotors and stators to create braking torque;
a first brake actuator and a second brake actuator each positioned for applying force on the same side of the load distribution plate opposite the alternating sequence of rotors and stators;
the first brake actuator including at least one first piston positioned in the housing such that pressurization on a side of the first piston opposite the load distribution plate causes the first piston to operatively engage the load distribution plate for compression of the alternating sequence of rotors and stators such that the rotors and stators are compressed together and thereby create braking torque;
a second brake actuator including at least one second piston arranged on the same side of the load distribution plate as the first piston, the second brake actuator including at least one spring operatively coupled to the second piston on a side of the second piston opposite the load distribution plate for biasing the second piston to operatively engage the load distribution plate for compression of the alternating sequence of rotors and stators to create braking torque and further including a fluid inlet on the same side of the second piston as the load distribution plate, such that pressurization on that same side of the second piston that overcomes the bias of the spring will prevent the compression of the alternating sequence of rotors and stators to thereby remove the braking torque of the second actuator.

14. The brake system of claim 13, wherein the load distribution plate is positioned between the at least one first piston and the series of rotors and stators.

15. The brake system of claim 13, wherein the pluralities of rotors and stators are configured to be free from oil flow.

\* \* \* \* \*